(12) United States Patent
Yamamoto (10) Patent No.: US 11,021,111 B2
(45) Date of Patent: Jun. 1, 2021

(54) DASH CAM MOUNT

(71) Applicant: Scosche Industries, Inc., Oxnard, CA (US)

(72) Inventor: Yasuhiro Yamamoto, Thousand Oaks, CA (US)

(73) Assignee: Scosche Industries, Inc., Oxnard, CA (US)

( * ) Notice: Subject to any disclaimer, the term of this patent is extended or adjusted under 35 U.S.C. 154(b) by 110 days.

(21) Appl. No.: 16/420,471

(22) Filed: May 23, 2019

(65) Prior Publication Data

US 2020/0079295 A1     Mar. 12, 2020

Related U.S. Application Data

(60) Provisional application No. 62/786,082, filed on Dec. 28, 2018, provisional application No. 62/730,321, filed on Sep. 12, 2018.

(51) Int. Cl.
| | |
|---|---|
| *B60R 11/04* | (2006.01) |
| *B60R 11/02* | (2006.01) |
| *F16B 47/00* | (2006.01) |
| *H02J 7/00* | (2006.01) |
| *B60R 11/00* | (2006.01) |

(52) U.S. Cl.
CPC ...... *B60R 11/0241* (2013.01); *B60R 11/0258* (2013.01); *B60R 11/04* (2013.01); *F16B 47/003* (2013.01); *H02J 7/0044* (2013.01); *B60R 2011/0026* (2013.01); *B60R 2011/0056* (2013.01); *B60R 2011/0077* (2013.01)

(58) Field of Classification Search
CPC ..... B60R 2011/0056; B60R 2011/0085; B60R 11/04; B60R 2011/0026
See application file for complete search history.

(56) References Cited

U.S. PATENT DOCUMENTS

| | | | |
|---|---|---|---|
| 7,344,114 B2* | 3/2008 | Richter | .................. B60R 11/02 248/205.5 |
| 7,380,759 B1* | 6/2008 | Whiteside | ............... B60R 11/02 248/183.1 |
| 7,735,791 B2* | 6/2010 | Bury | .................. B60R 11/0258 248/205.5 |
| 8,282,057 B2* | 10/2012 | Lin | ...................... F16M 11/105 248/205.5 |
| 10,649,492 B2* | 5/2020 | Peters | .................. G06F 1/1632 |

(Continued)

*Primary Examiner* — Bradley Duckworth
(74) *Attorney, Agent, or Firm* — Stetina Brunda Garred & Brucker (57) ABSTRACT

A mount for an electronic device includes a suction cup defining a front face attachable to a flat surface and an opposed rear face, a plunger having a plunger head attached to the rear face of the suction cup and a plunger arm extending away from the plunger head, a plunger stator defining a guide passage through which the plunger arm reciprocates relative to the plunger stator, a plunger actuator movably engaged with the plunger arm on an opposite side of the guide passage as the plunger head, an adapter attached to the plunger stator on the same side of the guide passage as the plunger head, the adapter defining an opening through which the plunger arm extends and a wire routing channel at least partially around a periphery of the adapter, and a mounting arm extending from the adapter and connectable to an electronic device.

11 Claims, 8 Drawing Sheets

(56) References Cited

U.S. PATENT DOCUMENTS

| | | | | |
|---|---|---|---|---|
| 10,865,934 | B2* | 12/2020 | Kwasniewski | F16M 11/2064 |
| 2007/0278371 | A1* | 12/2007 | Wang | F16M 13/022 |
| | | | | 248/309.3 |
| 2008/0296333 | A1* | 12/2008 | Brassard | B60R 11/02 |
| | | | | 224/555 |
| 2009/0294608 | A1* | 12/2009 | Brassard | F16B 47/00 |
| | | | | 248/205.5 |
| 2010/0320341 | A1* | 12/2010 | Baumann | F16B 47/006 |
| | | | | 248/206.2 |
| 2014/0183238 | A1* | 7/2014 | Lin | F16M 11/041 |
| | | | | 224/483 |
| 2015/0076299 | A1* | 3/2015 | Yu | F16M 11/2021 |
| | | | | 248/205.8 |
| 2016/0239713 | A1* | 8/2016 | Stone | B60R 11/04 |
| 2016/0381292 | A1* | 12/2016 | Lu | H04N 5/2258 |
| | | | | 348/36 |
| 2017/0214260 | A1* | 7/2017 | Kim | H02J 7/0044 |
| 2020/0019044 | A1* | 1/2020 | Comeau | B60R 11/00 |
| 2020/0070735 | A1* | 3/2020 | Kipper | F16M 13/022 |

* cited by examiner

FIG. 13

DASH CAM MOUNT

CROSS-REFERENCE TO RELATED APPLICATIONS

This application relates to and claims the benefit of U.S. Provisional Application No. 62/730,321 filed Sep. 12, 2018 and entitled "DASH CAM MOUNT," the entire disclosure of which is hereby wholly incorporated by reference. This application also relates to and claims the benefit of U.S. Provisional Application No. 62/786,082 filed Dec. 28, 2018 and entitled "DASH CAM MOUNT," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to device mounts for electronic devices and, more particularly, to dash cam mounts for use in vehicle interiors.

2. Related Art

In order to take advantage of the latest technology or to otherwise provide non-native functionality to automobiles and other vehicles, third party electronic devices are often retrofitted to vehicle interiors. Such devices may include, for example, navigation systems such as GPS (Global Positioning System) navigation assistance devices, audio systems such as satellite radio, docks and chargers for mobile devices, and image or audio capture devices such as dash cams or other outward or inward facing cameras. The various available modalities for securely mounting such devices allow for a variety of mounting positions within a vehicle interior. However, there remains a fundamental inconvenience in that such devices typically must be connected by one or more wires to a power outlet and/or data port located elsewhere in the vehicle. The resulting wires may create a messy, unattractive appearance within the vehicle and, in some cases, may even create a nuisance by obstructing a driver or passenger and hindering the free operation of the vehicle. In the case of a device mounted on a windshield or other window, such as a dash cam having an outward facing camera, dangling wires may even impair the driver's visibility, causing an unsafe situation.

BRIEF SUMMARY

The present disclosure contemplates various apparatuses for overcoming the above drawbacks accompanying the related art. One embodiment of the present disclosure is a mount for an electronic device. The mount may include a suction cup defining a front face attachable to a flat surface and an opposed rear face, a plunger comprising a plunger head attached to the rear face of the suction cup and a plunger arm extending away from the plunger head, a plunger stator defining a guide passage through which the plunger arm reciprocates relative to the plunger stator, a plunger actuator movably engaged with the plunger arm on an opposite side of the guide passage as the plunger head, an adapter attached to the plunger stator on the same side of the guide passage as the plunger head, the adapter defining an opening through which the plunger arm extends and a wire routing channel at least partially around a periphery of the adapter, and a mounting arm extending from the adapter and connectable to an electronic device.

Another embodiment the present disclosure is a mount for an electronic device. The mount includes a plurality of double-sided adhesive tape pieces, each of the double-sided adhesive tape pieces defining a front side attachable to a flat surface and an opposed rear side, a strip of separable panels, each of the separable panels defining a front side attached to the rear side of a respective one of the double-sided adhesive tape pieces and an opposed rear side defining a wire routing guide, and a mounting arm extending from one end of the strip and connectable to an electronic device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various apparatuses for mounting an electronic device such as a dash cam to a vehicle interior. The detailed description set forth below in connection with the appended drawings is intended as a description of several currently contemplated embodiments. It is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figures 1, 2:
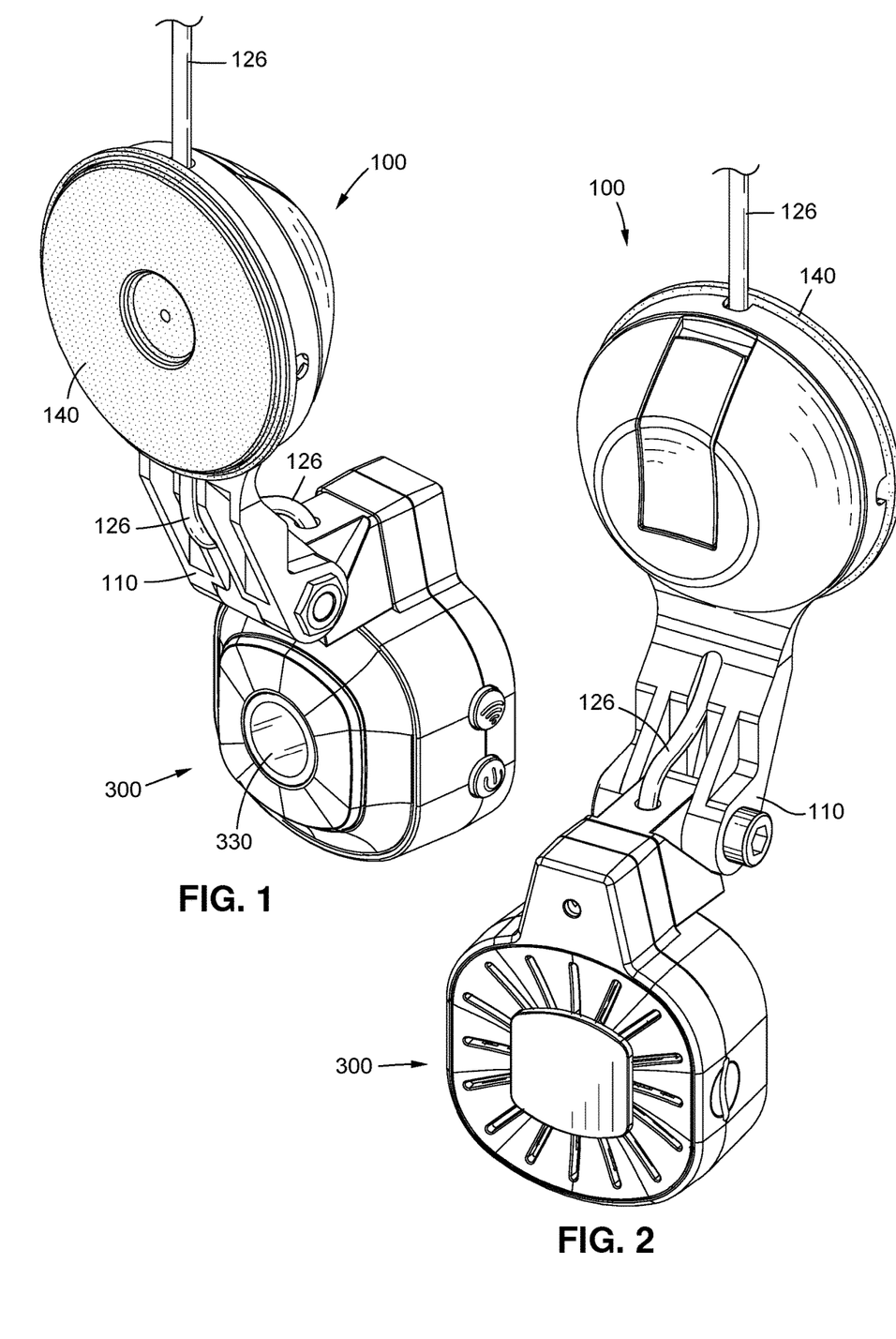
FIG. 1 is a front perspective view of a mount according to an embodiment of the present disclosure, together with a dash cam to be mounted to a vehicle interior using the mount.
FIG. 2 is a rear perspective view of the mount and dash cam.

FIG. 1 is a front perspective view of a mount 100 according to an embodiment of the present disclosure, together with a dash cam 300 to be mounted to a vehicle interior using the mount 100. FIG. 2 is a rear perspective view of the mount 100 and dash cam 300. A person wishing to mount the dash cam 300 to a windshield or other flat surface may attach a suction cup 140 of the mount 100 to the flat surface and position the dash cam 300 as desired relative to a mounting arm 110 of the mount 100, for example, with a camera 330 of the dash cam 300 pointing toward a window 400 (see FIGS. 7A and 7C) such as a windshield. A power cord or other wire 126 connected to the dash cam 300 may be routed through the mount 100 to a desired position away from the dash cam 300. In this way, the wire 126 may be hidden by the mount 100 and prevented from dangling in an unattractive, inconvenient, or hazardous way.

Figure 3:
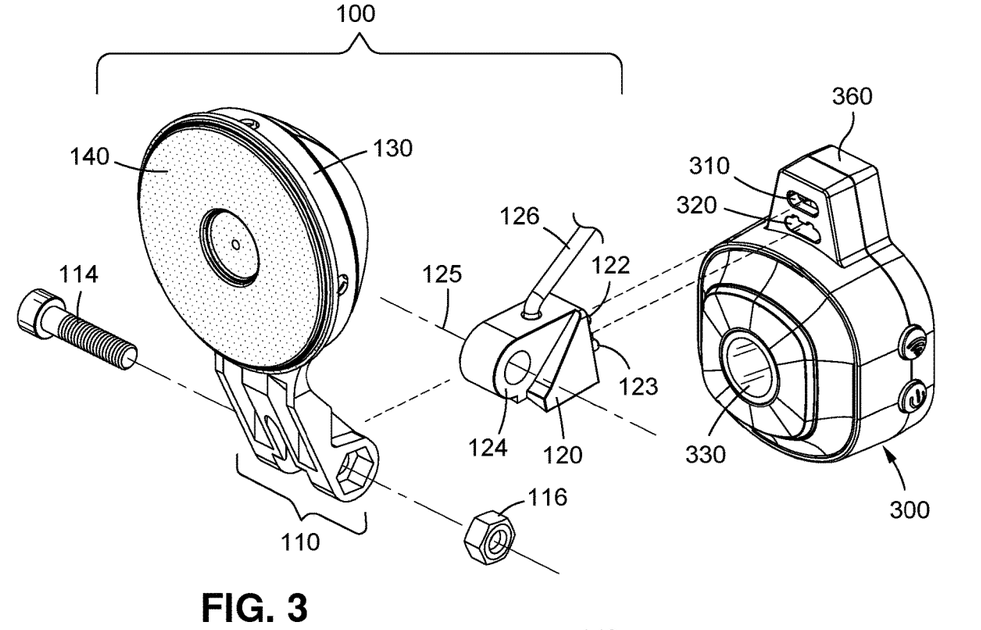
FIG. 3 is a front perspective view of the mount and dash cam with a mounting arm and device connector of the mount shown in exploded form.
Figure 4:
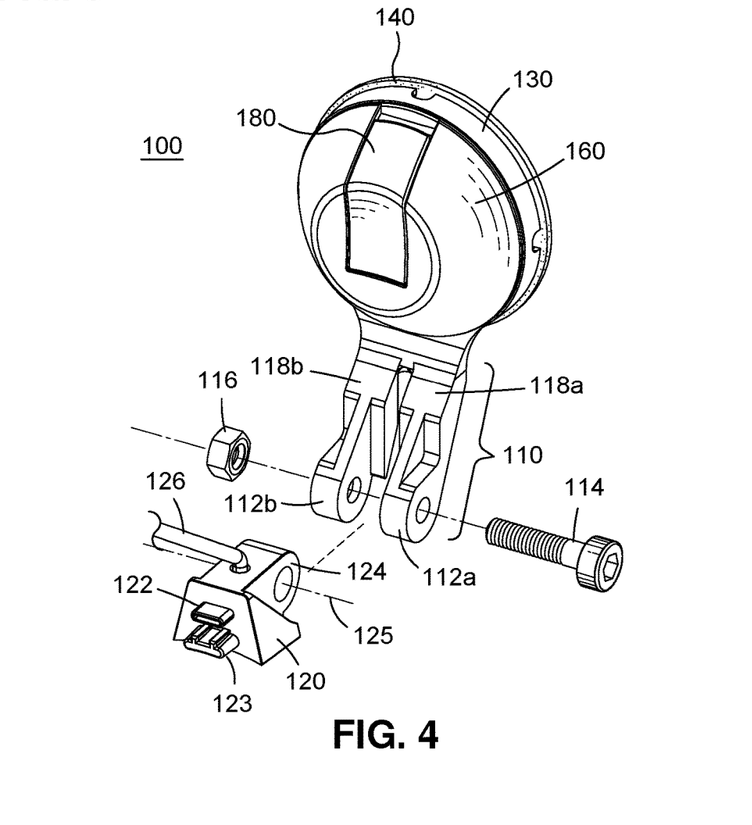
FIG. 4 is a rear perspective view of the mount with the mounting arm and device connector shown in exploded form.

FIG. 3 is a front perspective view of the mount 100 and dash cam 300, with the mounting arm 110 and a device connector 120 of the mount 100 shown in exploded form. FIG. 4 is a rear perspective view of the mount 100, with the mounting arm 110 and device connector 120 shown in exploded form. As shown in FIG. 3, the dash cam 300 may have, in addition to the camera 330, a connector socket 310, which may be, for example, a Universal Serial Bus (USB) socket such as a USB-C female connector. The connector socket 310 may receive a connector plug 122 (e.g. a USB plug such as a USB-C male connector) of the device connector 120 (see FIG. 4). The dash cam 300 may additionally have a dummy socket 320 for receiving a dummy plug 123 of the device connector 120 so that the connector plug 122 alone does not bear the weight of the dash cam 300 while the dash cam 300 is mounted using the mount 100. In some cases, for example, in the case of USB, the connector socket 310 and connector plug 122 may additionally serve as a connection for data transmission. Alternatively, it is contemplated that a separate data port connection may be made between the dash cam 300 and device connector 120, for example, using a data port adjacent to the connector socket 310. In a case where the dash cam 300 is wirelessly powered, e.g. by battery, solar, etc., the data connection may be the only connection between the dash cam 300 and the device connector 120. In this regard, it is noted that the description of the connector socket 310 and connector plug 122 applies equally to other socket/plug connections, including data port connections.

The socket(s) 310, 320 may be disposed on a shelf 360 extending to one side of the dash cam 300 such as upward from the top as shown. In this way, connections to the socket(s) 310, 320 may be made on the same side of the dash cam 300 as the camera 330, that is, the front of the dash cam 300, without obstructing the camera 300. This may be useful in the case of mounting an electronic device with an outward facing camera 330 such as the dash cam 300, since the mount 100 is then able to lie substantially flat against the window without needing to extend away from the window to connect to the dash cam 300 from behind or from the side. Otherwise, a larger mount more likely obstruct a driver's vision may be required.

Within the body of the device connector 120, the connector plug 122 may connect to the wire 126 to allow power and/or data transmission via the wire 126. The wire 126 may extend from the device connector 120 for some length, for example, around 6-18 feet, in order to allow routing through the mount 100 and subsequently along the interior of the vehicle to a vehicle power outlet and/or data port (not shown). The wire 126 may terminate in a vehicle-side connector such as a USB connector or cigarette lighter connector (not shown). Because the wire 126 is routed through the mount 100 before being routed along the vehicle interior as described below in more detail, the wire 126 need not dangle in midair between the dash cam 300 and the wall, ceiling, or other vehicle surface.

The device connector 120 may further have a knuckle 124 defining a hinge axis 125 for rotational engagement with the mounting arm 110 of the mount 100. The hinge axis 125 may be defined by a circular hole formed through the knuckle 124. Correspondingly, the mounting arm 110 may have a pair of knuckles 112a, 112b (see FIG. 4) rotationally engageable with the knuckle 124 of the device connector 120 by insertion of a pin 114 along the hinge axis 125. The pin 114 may be a threaded screw that is secured by a nut 116. It is noted that the particular arrangement and number of knuckles 124, 112a, 112b on the device connector 120 and mounting arm 110 may vary. For example, there may be two knuckles on the device connector 120 and one on the mounting arm 110. Other rotational engagement mechanisms may be used instead of a hinge having knuckles and a pin, including a ball and socket arrangement that allows 360-degree motion between the mounting arm 110 and device connector 120. Such an alternative may allow a mounted dash cam 300 to be panned right or left. With the mounting arm 110 rotationally connected to the device connector 120 and the device connector 120 plugged into the dash cam 300, the mount 100 may be attached to a windshield or other flat surface of a vehicle with the dash cam 300 held at a desired angle relative to the mount 100. In this way, the dash cam 300 may be mounted on windows 400 and other surfaces of various inclines while maintaining a desired field of view of the camera 330 (see FIGS. 7A and 7C).

Figure 5:
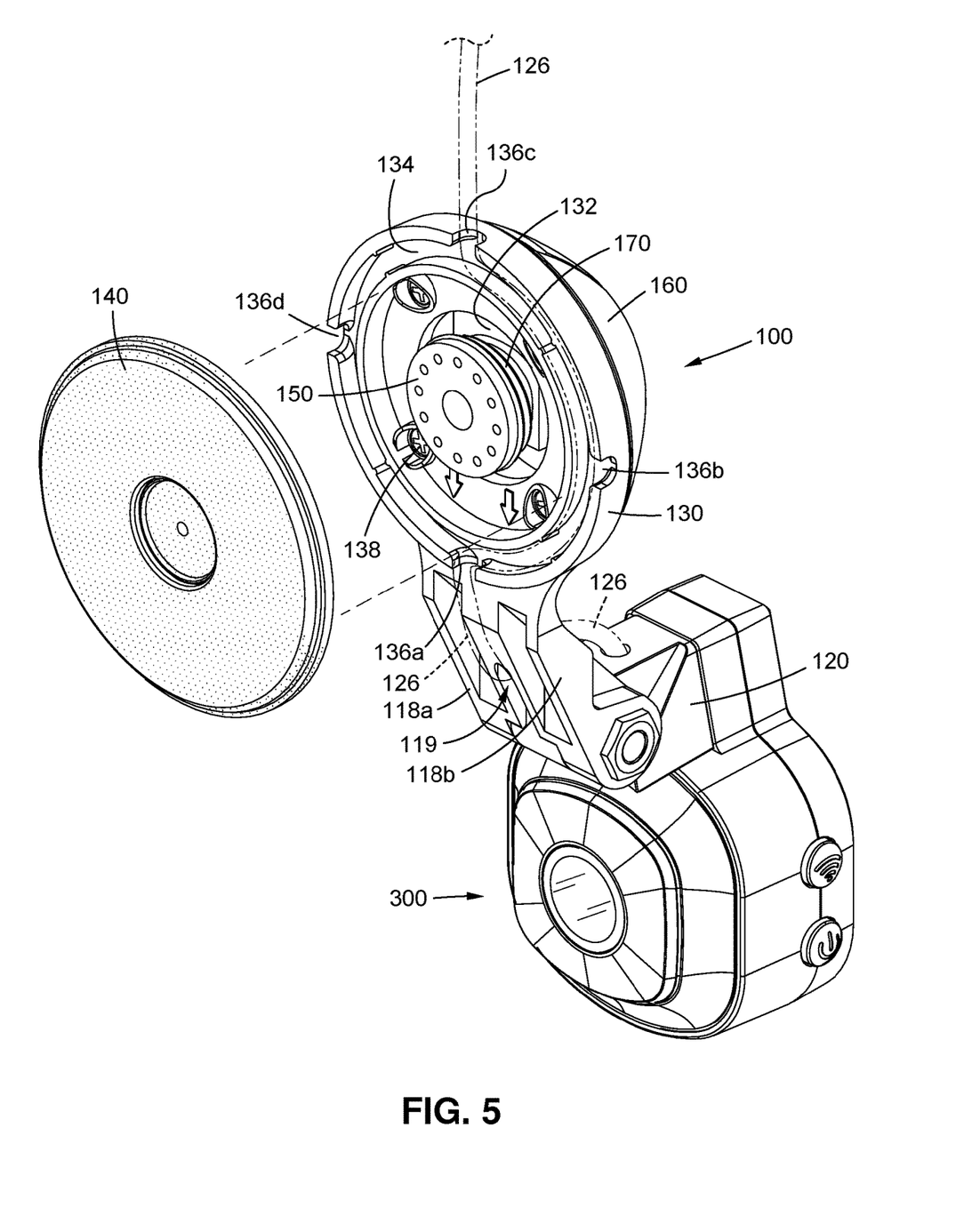
FIG. 5 is a front perspective view of the mount and dash cam with a suction cup of the mount removed.

FIG. 5 is a front perspective view of the mount 100 and dash cam 300 with the suction cup 140 of the mount 100 removed. As shown, the wire 126 extending from the device connector 120 may be routed from the back of the mounting arm 110 to the front, passing between the knuckles 112a, 112b. In this regard, a mounting arm wire routing channel 119 may be defined between fingers 118a, 118b extending respectively from the knuckles 112a, 112b as shown (see FIGS. 4 and 5), and the wire 126 may be routed along the mounting arm wire routing channel 119. In a case where the mounting arm 110 has only a single knuckle and a single finger, the mounting arm wire routing channel 119 may instead be defined by a borehole through the single finger mounting arm 110 or by a channel along one side thereof.

As shown in FIG. 5, the mount 100 may further include an adapter 130 from which the mounting arm 110 extends. The mounting arm 110 and the adapter 130 may be integrally formed, for example, from a single piece of plastic. The adapter 130 may be shaped so as to be coextensive with the suction cup 140 and may, for example, be a circular piece of substantially the same diameter as the disc-shaped suction cup 140 shown. Having been routed to the front of the mounting arm 110, the wire 126 may be routed through the adapter 130 along a wire routing channel 134 of the adapter 130. For example, the wire 126 may enter the adapter 130 through a wire entry passage 136*a* at a first end of the adapter 130, travel through the adapter 130 along the wire routing channel 134 and exit the adapter 130 through a wire routing passage 136*c* at a second end of the adapter 130 opposite the first end. The wire routing channel 134 may extend at least partially around a periphery of the adapter 130, for example, defining a circular channel around the perimeter of the circular adapter 130 shown. Additional wire routing passages 136*b*, 136*d* may be provided as alternative exits for the wire 126. In this way, the wire 126 may exit from the adapter 130 at an appropriate side depending on which direction the wire 126 will be routed upon leaving the mount 100.

Figure 6:
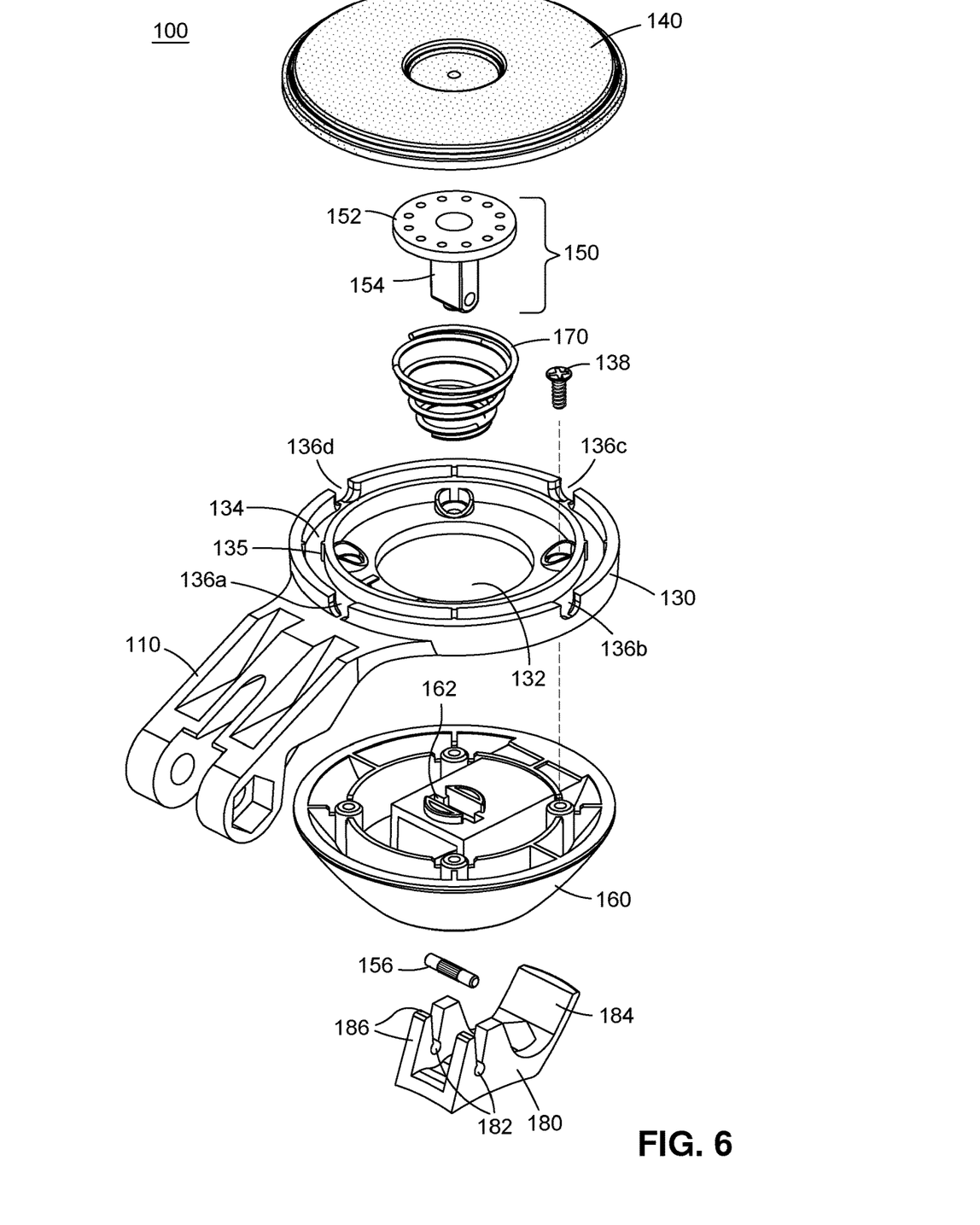
FIG. 6 is an exploded perspective view of the mount.

FIG. 6 is an exploded perspective view of the mount 100. The device connector 120 is omitted. As shown in FIG. 6, the adapter 130 may be assembled between the suction cup 140 and a plunger actuator 180 that actuates the suction cup 140. In particular, the suction cup 140 may define a front face attachable to the windshield or other flat surface such as the. window 400 in FIGS. 7A and 7C, and an opposed rear face that may be manipulated to create a vacuum between the suction cup 140 and the flat surface so as to increase suction. To this end, a plunger 150, disposed behind the suction cup 140, may have a plunger head 152 attached to the rear face of the suction cup 140 and a plunger arm 154 extending away from the plunger head 152 (downwardly in FIG. 6). The plunger 150 may be formed integrally with the suction cup 140. The suction cup 140 itself or a portion thereof may serve as the plunger head 152. The plunger 150 may be attached to the suction cup 140 by adhesive or by insertion in a sleeve or abutting a flange formed on the rear face of the suction cup 140. In a case where the plunger head 152 is a separate piece from the suction cup 140, the plunger head 152 may be a flat, circular member that contacts the suction cup 140 in the center thereof.

On the other side of the adapter 130 from the suction cup 140 (below the adapter 130 in FIG. 6), a plunger stator 160 may be attached to the adapter 130, for example, by one or more screws 138. The plunger stator 160 may define a guide passage 162 through which the plunger arm 154 reciprocates relative to the plunger stator 160. As the plunger arm 154 moves in one direction (downward in FIG. 6) relative to the plunger stator 160, the plunger head 152 pulls the central portion of the suction cup 140 away from the windshield or other flat surface, generating the vacuum between the suction cup 140 and the flat surface and making it more difficult to detach the suction cup 140 from the flat surface. As the plunger arm 154 moves in the opposite direction (upward in FIG. 6) relative to the plunger stator 160, the plunger head 152 pushes the central portion of the suction cup 140 toward the windshield or other flat surface, reducing or eliminating the vacuum and making it easier to detach the suction cup 140 from the flat surface.

The plunger actuator 180 may be movably engaged with the plunger arm 154 on the opposite side of the guide passage 162 as the plunger head 152 (e.g. below the guide passage 162 in FIG. 6). For example, a plunger pin 156 inserted through or otherwise attached to the plunger arm 154 may be rotatably engaged by two circular traps 182 formed in the plunger actuator 180. As shown in FIG. 6, the traps 182 may be circular grooves formed in the plunger actuator 180 that are open on one side to allow insertion of the plunger pin 156, with the opening being smaller than the diameter of the plunger pin 156. In this way, the plunger pin 156 may be prevented from entering or exiting the traps 182 unless the material of the plunger actuator 180 is flexed to widen the openings of the traps 182. With the plunger pin 156 held by the traps 182, the plunger actuator 180 may then pivot about the plunger pin 156 without releasing the plunger pin 156.

By appropriately sizing the plunger actuator 180 and surrounding walls of the plunger stator 160, the pivoting of the plunger actuator 180 about the plunger pin 156 may translate into reciprocal motion of the plunger pin 156 and plunger arm 154 relative to the plunger stator 160. The plunger actuator 180 may act as a lever operable by a user of the mount 100. As the user pulls a handle 184 of the plunger actuator 180 out of the plunger stator 160 (downward in FIG. 6), the plunger actuator 180 may push the plunger pin 156 and plunger arm 154, causing the plunger 150 to move upward to reduce or eliminate the vacuum between the suction cup 140 and the windshield or other flat surface. With the handle 184 of the plunger actuator 180 pulled out in this way, the plunger actuator 180 may be said to be in the "unlocked" position. As the user pushes the handle 184 of the plunger actuator 180 into the plunger stator 160 (upward in FIG. 6), the plunger actuator 180 may pull the plunger pin 156 and plunger arm 154, causing the plunger 150 to move downward to increase or create the vacuum. With the handle 184 of the plunger actuator 180 pushed in in this way, the plunger actuator 180 may be said to be in the "locked" position. In this way, the plunger actuator 180 may actuate the suction cup 140.

The plunger head 152 may be biased away from the plunger stator 160 by a biasing member 170 such as a spring disposed between the plunger stator 160 and the plunger head 152. The biasing member 170 may allow the plunger actuator 180 to remain in the unlocked position as the biasing member 170 urges the plunger head 152 toward the suction cup 140. This may create an appropriate resistance that the user feels when he tries to operate the handle 184 of the plunger actuator 180 to move the plunger actuator 180 away from the unlocked position.

At the same time, the plunger actuator 180 may have one or more cam surfaces 186 that ride along an interior surface of the plunger stator 160 as the plunger actuator 180 moves between the unlocked and locked positions, such that the distance between the traps 182 and the interior surface of the plunger stator 160 changes depending on the rotational position of the plunger actuator 180. With the plunger pin 156 held by the traps 182, this changing distance determines how far the handle 184 is pulled through the guide passage 162 by the plunger actuator 180. Thus, by appropriately defining the cam surface(s) 186, the distance that the plunger arm 154 is pulled by the plunger actuator 180 through the guide passage 162 may be set to be at a maximum when the plunger actuator 180 is in between the unlocked and locked positions, resulting in the greatest urging force of the biasing member 170 at some threshold position that is neither the unlocked nor the locked position. As a result, the biasing member 170 may urge the plunger actuator 180 toward both the unlocked state and the locked state, depending on the position of the plunger actuator 180. In this way, the biasing member 170 may be used to resist locking as well as unlocking, with the plunger actuator 180 "snapping" toward either the locked or unlocked position after crossing the threshold position defined by the cam surface(s) 186. Thus, the user may feel an appropriate resistance as he attempts to operate the handle 184 of the plunger actuator 180 either to move the plunger actuator 180 away from the unlocked position or away from the locked position.

As noted above, the wire 126 may travel through the adapter 130 along the wire routing channel 134 at least partially around a periphery of the adapter 130 between the wire entry passage 136a and one of the wire routing passages 136b, 136c, 136d. By routing the wire 126 around the periphery of the adapter 130, the wire routing channel 134 may allow the wire 126 to pass through the adapter 130 without interfering with the action of the plunger 150 as the plunger actuator 180 moves between the unlocked and locked positions. In this regard, the wire routing channel 134 may be formed around an opening 132 defined through the center of the adapter 130, and the plunger 150 and biasing member 170 may be disposed so as to extend through the opening 132 between the suction cup 140 and the plunger stator 160. In addition, the positioning of the wire routing channel 134 at the periphery of the adapter 130 may allow easy access to the wire routing channel 134 by a user wishing to reroute the wire 126 or remove/replace the same. For instance, the wire 126 may be rerouted to a different wire routing passage 136b, 136c, 136d, or a different device connector 120 may be connected to the mounting arm 110 and linked with the wire 126.

The user may simply pull the suction cup 140 away from the adapter 130 at the periphery thereof, revealing the wire routing channel 134. There is no need to interfere with the connection of the suction cup 140 to the plunger 150, the connection of the plunger 150 to the plunger actuator 180, or the connection of the adapter 130 to the plunger stator 160. After placing the wire 126, or a new or different wire 126 in the wire routing channel 134 at the desired position, the user may simply release the suction cup 140, allowing the suction cup 140 to again cover the wire routing channel 134 and hide the wire 126. The wire 126 may be prevented from easily falling out of the wire routing channel 134 by ridges 135 formed therein (see FIG. 6).

Figures 7A, 7B, 7C:
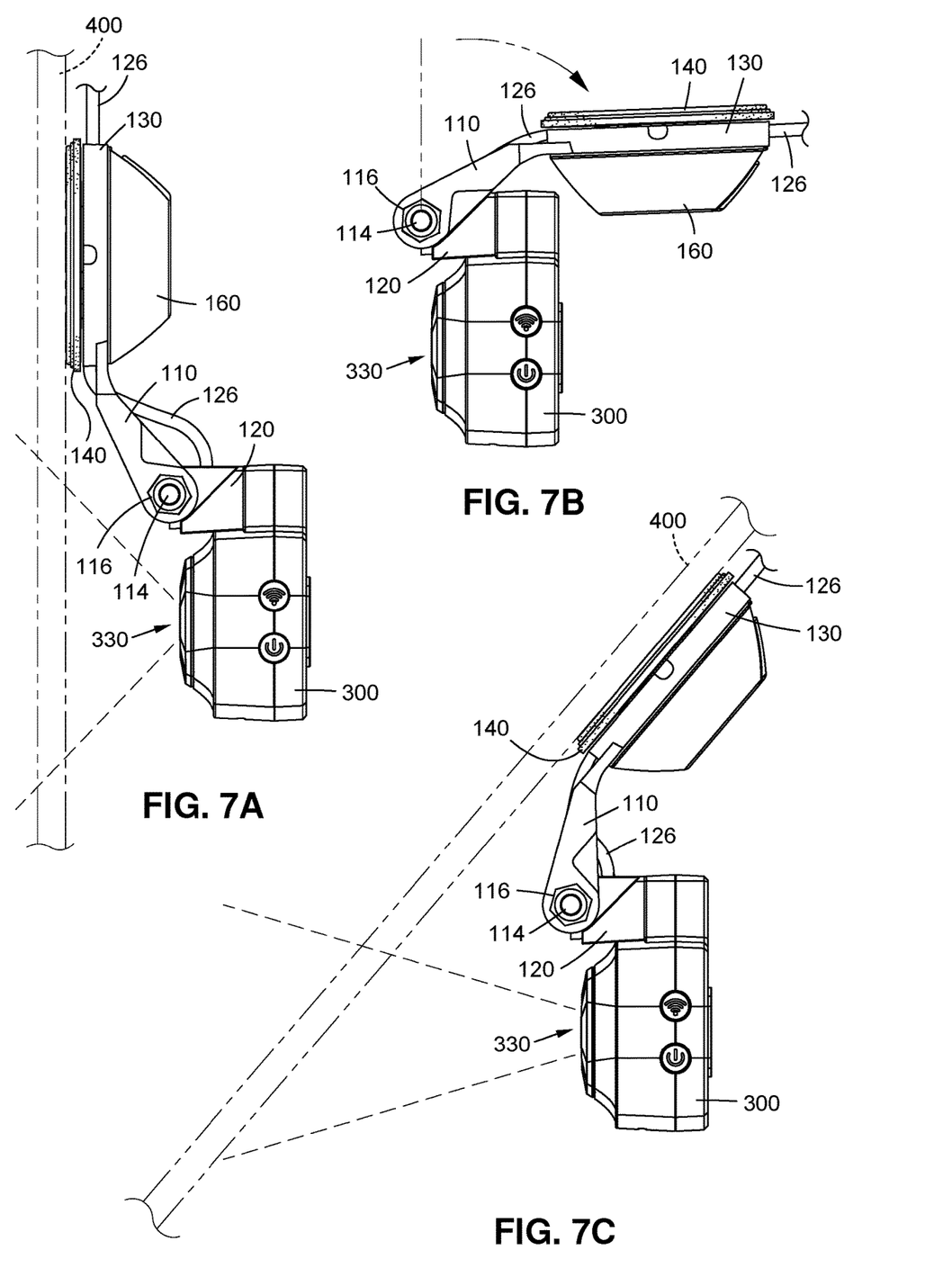
FIGS. 7A, 7B, and 7C are side views of the mount and dash cam, with FIG. 7A showing the mount in a state in which the suction cup is attached to a window, FIG. 7B showing the mount in a state in which the mounting arm is pivoted away from the window relative to the device connector, and FIG. 7C showing the mount in another state in which the suction cup is attached to a window.

FIGS. 7A, 7B, and 7C are side views of the mount 100 and dash cam 300. FIG. 7A shows the mount 100 in a state in which the suction cup 140 is attached to a window 400, and FIG. 7B shows the mount 100 in a state in which the mounting arm is pivoted away from the window 400 relative to the device connector 120. FIG. 7C again shows the mount 100 in a state in which the suction cup 140 is attached to a window 400, this time an angled window 400 such as a windshield of a car or other vehicle. As shown in FIGS. 7A and 7C, the dash cam 300 may be mounted on windows 400 and other surfaces of various inclines while maintaining a desired field of view of the camera 330. Owing to the connection of the dash cam 300 to the device connector 120 and the routing of the wire 126 through the mount 100, no dangling wires are necessary. The wire 126 is already adjacent to the window 400 as it leaves the adapter 130 and remains so even if the position of the dash cam 300 is adjusted relative to the mount 100. The wire 126 may thereafter be discreetly routed along the window 400 and/or other vehicle interior surfaces to an appropriate outlet in the vehicle.

Figure 8:
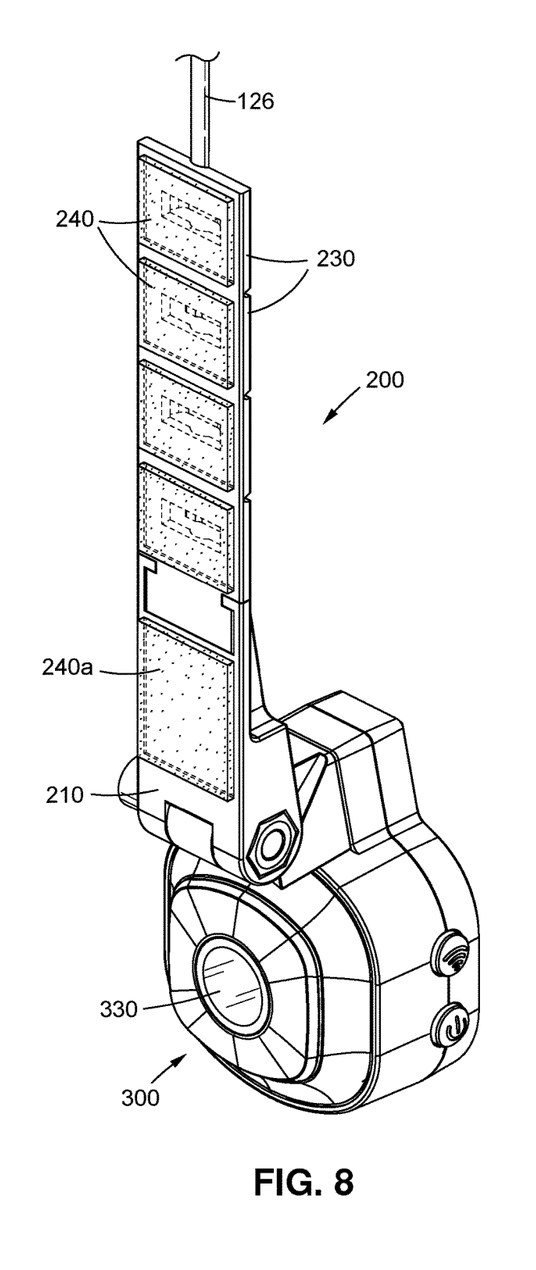
FIG. 8 is a front perspective view of another mount according to another embodiment of the present disclosure, together with a dash cam to be mounted to a vehicle interior using the mount.
Figure 9:
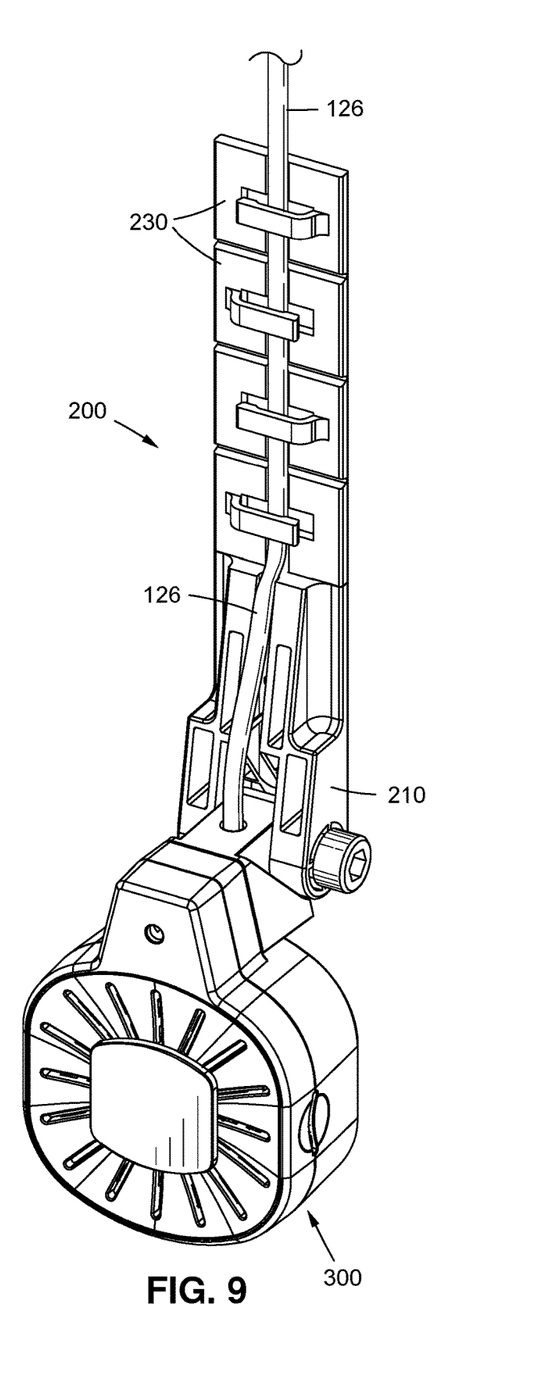
FIG. 9 is a rear perspective view of the mount and dash cam.

FIG. 8 is a front perspective view of a mount 200 according to another embodiment of the present disclosure, together with a dash cam 300 to be mounted to a vehicle interior using the mount 200. FIG. 9 is a rear perspective view of the mount 200 and dash cam 300. A person wishing to mount the dash cam 300 to a windshield or other flat surface may attach a plurality of double-sided adhesive tape pieces 240, 240a of the mount 200 to the flat surface and position the dash cam 300 as desired relative to a mounting arm 210 of the mount 200, for example, with a camera 330 of the dash cam 300 pointing toward a window 400 (see FIGS. 12A and 12C) such as a windshield. The power cord or other wire 126 described in relation to FIGS. 1-7C, which may be connected to the dash cam 300 via the device connector 120 as described above, may be routed through the mount 200 to a desired position away from the dash cam 300. In this way, as in the case of the mount 100, the wire 126 may be hidden by the mount 200 and prevented from dangling in an unattractive, inconvenient, or hazardous way. While the wire 126 may remain at least partially visible as it is routed through the mount 200, the wire 126 may nevertheless be effectively hidden from the user's eye for the extent of the mount 200 as the wire 126 may visually overlap with the mount 200 rather than dangle in another direction. In other words, for the length of the mount 200, the visual obtrusiveness of the wire 126 may be only that of the mount 200 without the wire presenting an additional visual obstruction.

Figure 10:
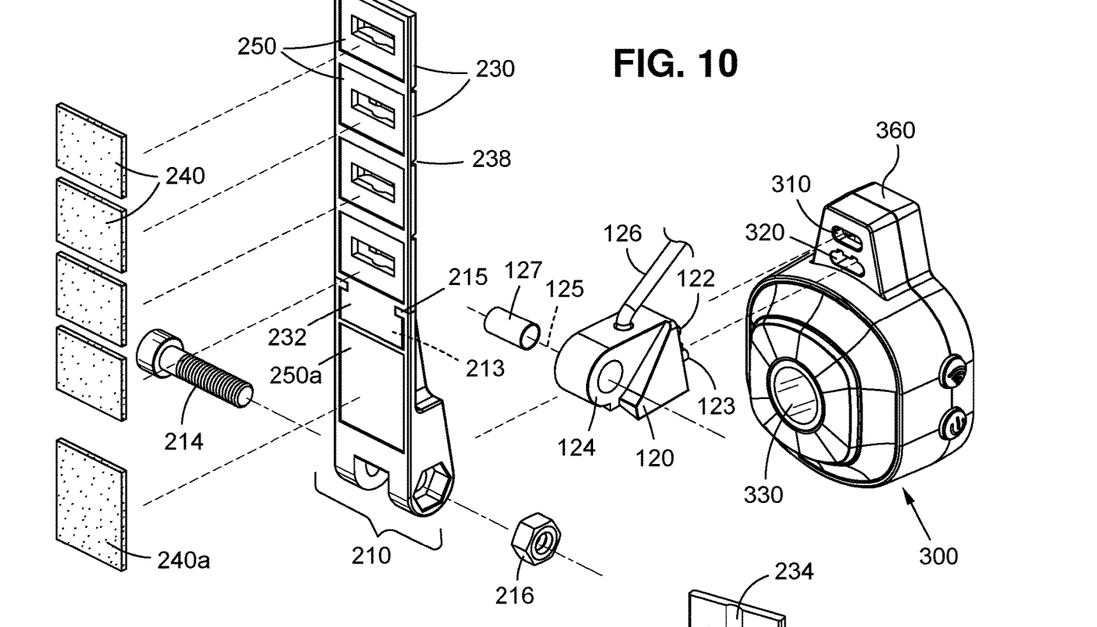
FIG. 10 is a front perspective view of the mount and dash cam with a mounting arm and device connector of the mount shown in exploded form.
Figure 11:
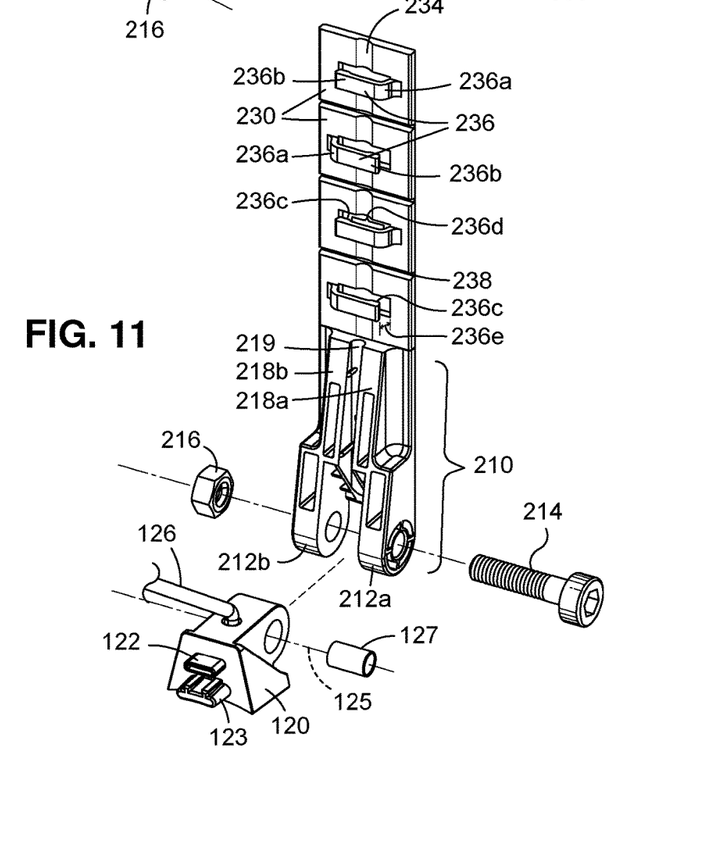
FIG. 11 is a rear perspective view of the mount with the mounting arm and device connector shown in exploded form.

FIG. 10 is a front perspective view of the mount 200 and dash cam 300, with the mounting arm 210 and the device connector 120 shown in exploded form. FIG. 11 is a rear perspective view of the mount 200, with the mounting arm 210 and device connector 120 shown in exploded form. The device connector 120 of the mount 200, including the wire 126, as well as the connection between the device connector 120 and the device 300, may be the same as described in relation to the mount 100. Therefore, the same reference numbers are used, and the description is omitted.

The device connector 120 may engage with the mounting arm 210 of the mount 200 in the same way as it engages with the mounting arm 110 of the mount 100. For example, the device connector 120 may have a knuckle 124 defining a hinge axis 125 for rotational engagement with the mounting arm 210 of the mount 200. The hinge axis 125 may be defined by a circular hole formed through the knuckle 124. Correspondingly, the mounting arm 210 of the mount 200 may have a pair of knuckles 212a, 212b (see FIG. 11) rotationally engageable with the knuckle 124 of the device connector 120 by insertion of a pin 214 along the hinge axis 125. Optionally, the pin 214 may be inserted through a bushing 217, which may also be used with the device connector 120 of FIG. 4. The pin 214 may be a threaded screw that is secured by a nut 216. As in the case of the mount 100, it is noted that the particular arrangement and number of knuckles 124, 212a, 212b on the device connector 120 and mounting arm 210 may vary. For example, there may be two knuckles on the device connector 120 and one on the mounting arm 210. Again, other rotational engagement mechanisms may be used instead of a hinge having knuckles and a pin. A ball and socket arrangement could be used to allow 360-degree motion between the mounting arm 210 and device connector 120, thus allowing a mounted dash cam 300 to be panned right or left. With the mounting arm 210 rotationally connected to the device connector 120 and the device connector 120 plugged into the dash cam 300, the mount 200 may be attached to a windshield or other flat surface of a vehicle with the dash cam 300 held at a desired angle relative to the mount 200. In this way, the dash cam 300 may be mounted on windows 400 and other surfaces of various inclines while maintaining a desired field of view of the camera 330 (see FIGS. 12A and 12C).

As shown in FIGS. 8-11, the mount 200 may further include a strip of separable panels 230 from which the mounting arm 210 extends. The panels 230 may be made of a tearable, cuttable, or otherwise easily separable material such as a synthetic polymer such as nylon so that a user may separate and discard one or more of the panels 230 depending on the desired length of the strip. Connection between the strip of panels 230 and the mounting arm 210 may be made by adhering a tab 232 integrally formed with the strip of panels 230 to the mounting arm 210. As shown in FIGS. 8 and 10, the tab 232 may be adhered to a tab-receiving tray 213 on the front of the mounting arm 210. The tray 213 may be covered by the tab 232 in FIGS. 8 and 10. Moreover, the tray 213 may be bordered on three sides by walls 215. A fourth side of the tab-receiving tray 213, that is, the side from which the strip of panels 230 extends, may be partially or completely borderless in order to allow the strip of panels 230 to extend outward from the mounting arm 210 while remaining flush with the tab 232. For example, as shown, the walls 215 on the fourth side of the tab-receiving tray 213 may extend inward only partially on either side of the tab 232 to act as a guide for the tab 232 and to help retain the tab 232 within the tab-receiving tray 213.

As shown in FIGS. 8 and 10, the double-sided adhesive tape pieces 240 may be disposed on the front sides of respective separable panels 230. For example, each of the panels 230 may have, on its front side, a tape tray 250 formed therein defining a recess of the same size and shape as a double-sided adhesive tape piece 240. The panels 230 may also be slightly larger than the double-sided adhesive tape piece 240 for ease of assembly. With one adhesive side of each tape piece 240 adhered to a respective panel 230 in this way, the opposed front side of each tape piece 240 may face forward to be used for securing the mount 200 to a window 400 (see FIGS. 12A and 12C) such as a windshield or to another flat surface. An additional mounting arm tape piece 240a may be disposed directly on the mounting arm 210, e.g. in a tape tray 250a formed on the front side thereof. The mounting arm tape piece 240a may ensure a secure attachment of the mount 200 to the windshield or other flat surface even in a case where little room is available to place the mount 200 and therefore few or none of the panels 230 is used.

As best shown in FIG. 9, the wire 126 extending from the device connector 120 may be routed along the mounting arm 210, remaining in the back of the mounting arm 210, toward the strip of panels 230. In this regard, a mounting arm wire routing channel 219 may be defined between fingers 218a, 218b extending respectively from the knuckles 212a, 212b as shown, and the wire 126 may be routed along the mounting arm wire routing channel 219 (see FIGS. 9 and 11). In a case where the mounting arm 210 has only a single knuckle and a single finger, the mounting arm wire routing channel 219 may instead be defined by a channel along one side thereof.

Having been routed along the mounting arm 210, the wire 126 may be routed along the back of the strip of separable panels 230, i.e. the side opposite the double-sided adhesive tape pieces 240. To position the wire 126 in one place as the wire travels along the panels 230, the wire 126 may be routed through a wire routing channel 234 collectively formed on the rear sides of the strip of separable panels 230 (see FIGS. 9 and 11), i.e. with each panel 230 defining a portion of the wire routing channel 234 that aligns with that of an adjacent panel 230. The wire 126 may thus be routed from the mounting arm wire routing channel 219 along the wire routing channel 234 defined by the backs of the panels 230, eventually exiting the mount 200 at the end of the last of the strip of separable panels 230. As such, the wire routing channel 219 may serve as a wire routing guide for the wire 126.

In order to secure the wire 126 to the rear side of each of the separable panels 230, each of the separable panels 230 may have a clip 236 that extends from the rear side thereof (see FIGS. 9 and 11). The clips 236 may be aligned with the mounting arm wire routing channel 219. The wire 126 may thus be routed from the mounting arm wire routing channel 219 along the backs of the separable panels 230 while being secured by the clips 236, eventually exiting the mount 200 at the end of the last of the strip of separable panels 230. As such, the clips 236 may collectively serve as a wire routing guide for the wire 126, irrespective of whether the wire routing channel 219 is formed in the panels 230.

Each of the clips 236 may define a closed end 236a where the clip 236 extends from the rear side of the panel 230 and an open end 236b where the clip 236 terminates to form a gap 236e between the clip 236 and the rear side of the panel 230. The open end 236b of each of the clips 236 may have a protrusion 236c extending toward the rear side of the panel 230, the protrusion 236c defining a wire retaining recess 236d between the closed end 236a and the open end 236b of the clip 236. The protrusion 236c may extend close enough to the rear side of the panel 230 such that the resulting gap 236e is smaller than the diameter of the wire 126. As such, it may be necessary to flex the clip 236 away from the panel 230 to allow the wire 126 to pass through the gap 236e and into the wire retaining recess 236d. When not being flexed, the clip 236 may return to an unflexed state such that the protrusion 236c prevents the wire 126 from easily falling out of the wire retaining recess 236d via the gap 236e. The unflexed state of the clip 236 may be defined such that the clip 236 may hold the wire 126 in the wire retaining recess 236d without being flexed. That is, the distance between the rear side of each panel 230 and the retaining recess 236d may be designed to be at least as great as the diameter of the wire 126. In a case where a wire routing channel 234 is formed in the rear side of each panel 230 as described above, the unflexed state of the clip 236 may be defined such that the clip 236 may hold the wire 126 in the wire retaining recess 236d without being flexed while the wire 126 is within the wire routing channel 234. That is, the distance between the wire routing channel 234 and the retaining recess 236d may be designed to be at least as great as the diameter of the wire 126. In this way, unnecessary flexing of the clip 236 can be avoided, resulting in a prolonged the lifetime of the clip 236.

As best seen in FIGS. 9 and 11, the clips 236 of adjacent panels 230 may be arranged closed end 236a to open end 236b in a direction of the strip of panels 230. For example, with the mount 200 held such that the strip of panels 230 extends upward from the mounting arm 210 as shown in FIGS. 9 and 11, the strip of panels 230 may be arranged in an alternating pattern of rightward facing open end 236b, leftward facing open end 236b, rightward facing open end 236b, leftward facing open end 236b, etc. (or two rightward, two leftward, two rightward, two leftward, etc.) or in any other pattern or random arrangement including adjacent panels 230 having opposite orientation. By arranging adjacent panels 230 opposite to each other in this way, the wire 126 may be prevented from easily coming out of the mount 200 even in a case where the entire wire 126 is pulled in one direction with enough force to flex the clips 236.

Figures 12A, 12B, 12C, 13:
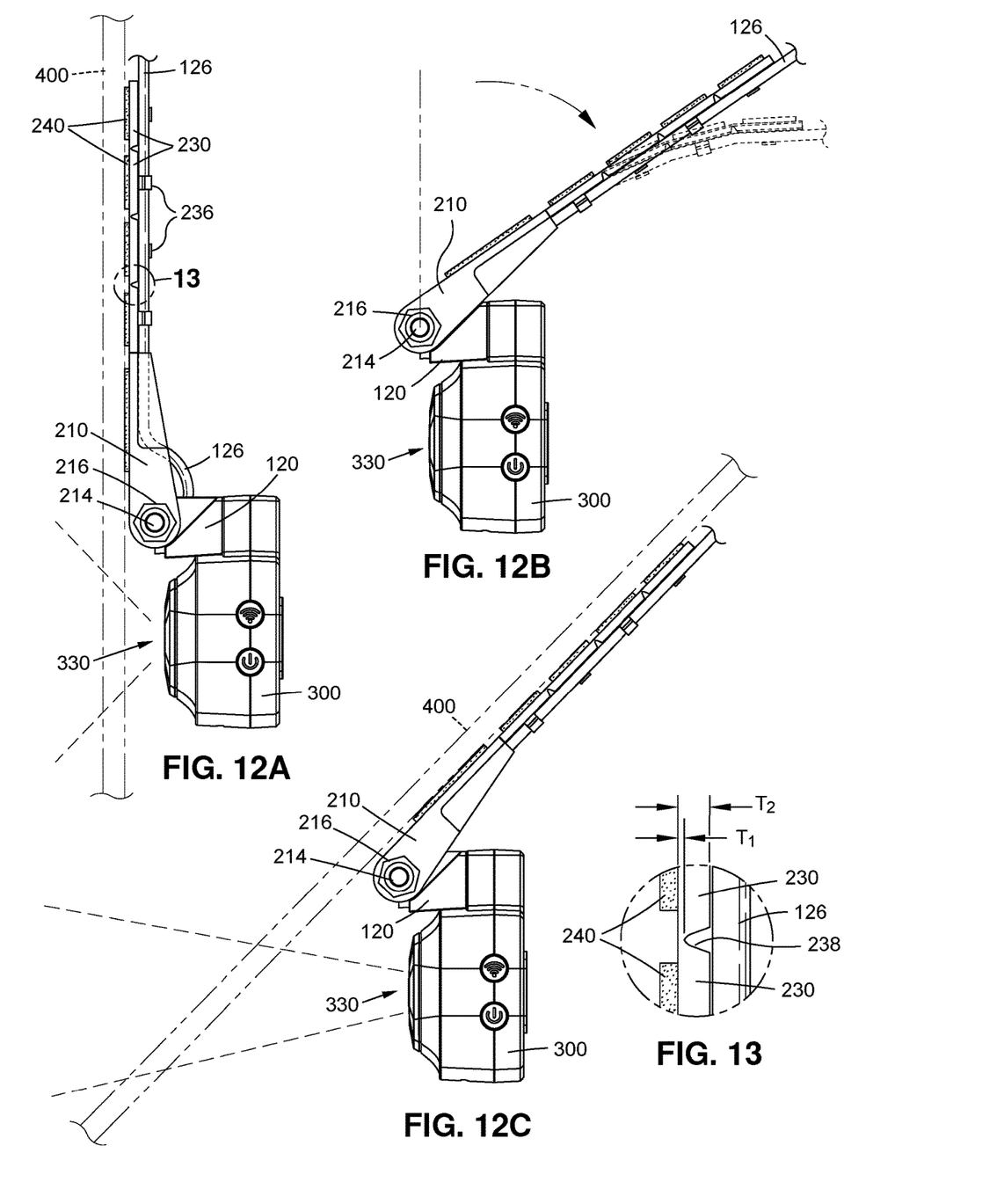
FIGS. 12A, 12B, and 12C are side views of the mount and dash cam, with FIG. 12A showing the mount in a state in which a plurality of double-sided adhesive tape pieces of the mount are attached to a window, FIG. 12B showing the mount in a state in which the mounting arm is pivoted away from the window relative to the device connector, and FIG. 12C showing the mount in another state in which the plurality of double-sided adhesive tape pieces of the mount are attached to a window.
FIG. 13 is an enlarged view of a portion of FIG. 12A.

FIGS. 12A, 12B, and 12C are side views of the mount 200 and dash cam 300. FIG. 12A shows the mount 200 in a state in which the double-sided adhesive tape pieces 240, 240a are attached to a window 400, and FIG. 12B shows the mount 200 in a state in which the mounting arm is pivoted away from the window 400 relative to the device connector 120. FIG. 12C again shows the mount 100 in a state in which the double-sided adhesive tape pieces 240, 240a are attached to a window 400, this time an angled window 400 such as a windshield of a car or other vehicle. As shown in FIGS. 12A and 12C, the dash cam 300 may be mounted on windows 400 and other surfaces of various inclines while maintaining a desired field of view of the camera 330. Owing to the connection of the dash cam 300 to the device connector 120 and the routing of the wire 126 through the mount 200, no dangling wires are necessary. The wire 126 is already adjacent to the window 400 as it leaves the last of the strip of separable panels 230 and remains so even if the position of the dash cam 300 is adjusted relative to the mount 200. The wire 126 may thereafter be discreetly routed along the window 400 and/or other vehicle interior surfaces to an appropriate outlet in the vehicle.

As noted above, the strip of separable panels 230, including the tab 232, may be made of a tearable, cuttable, or otherwise easily separable material such as a synthetic polymer (e.g. nylon) so that a user may separate and discard one or more of the panels 230 depending on the desired length of the strip. In this way, the mount 200 can be configured to fit a desired space in the user's vehicle. In order to make it easier to separate the panels 230 from each other, the rear sides of the panels 230 may define a notch 238 between adjacent panels 230 (see FIGS. 10, 12A, and 13). FIG. 13, which is an enlarged view of a portion of FIG. 12A, shows a detailed view of one example of such a notch 238. As shown, one or more of the separable panels 230 has a first thickness $T_1$ at a border thereof and a second thickness $T_2$ interior of the border, with the first thickness $T_1$ being less than the second thickness $T_2$. In this way, the separable panels 230 can be designed so as to more readily separate at the borders between panels 230 than elsewhere, allowing a user to tear off and discard one or more panels without risking accidental tearing of the remaining panels 230.

The clips 236 may be made of the same material as the panels 230 (e.g. nylon) and formed integrally therewith. For example, a portion of each panel 230 that will form the clip 236 may be punched out or otherwise separated from a sheet of the material except at an end that will form the closed end 236a, resulting in a hole through each panel 230 as shown (see FIGS. 10 and 11). The clips 236 may then be molded into the desired shape together with the strip of panels 230 and tab 232. Such manufacturing process may be simpler and result in a product having reduced weight relative to a process where the clips 236 are formed by adding material to the panels 230. The holes resulting from punching out the clips 236 may also provide an easy means of removing the double-sided adhesive tape pieces 240 should the need arise. More specifically, this may be achieved by poking the tape pieces 240 out from behind.

The other parts of the mount 100, 200, including the mounting arm 110, device connector 120, adapter 130, plunger stator 160, plunger actuator 180, and mounting arm 210, may be made of plastic or elastomer, e.g., a thermoplastic polymer such as acrylonitrile butadiene styrene (ABS) or a polyurethane plastic such as thermoplastic polyurethane (TPU). For example, the device connector 120 may be made of TPU, which may have a shore A hardness of around 85) with the mounting arm 110, 210 and adapter 130 made of ABS.

In the illustrated embodiments, the device connector 120 is shown as having a connector plug 122 and dummy plug 123 while the dash cam 300 is shown as having a connector socket 310 and dummy socket 320. However, the disclosed embodiments are not intended to be so limited. For example, the dash cam 300 may have the connector plug 122 and dummy plug 123 while the device connector 120 has the connector socket 310 and dummy socket 320, the connector socket 310 being connected to the wire 126 within the body of the device connector 120. Alternatively, the connector plug 122 and dummy socket 320 may be on the same side (i.e. either the device connector 120 or the dash cam 300) and the connector socket 310 and dummy plug 123 may be on the other.

As noted above, it is contemplated that a separate data port connection may be made between the dash cam 300 and device connector 120. In this regard, the wire 126 may be a bundle of multiple wires for different connections, all of which may be routed through the mount 100, 200 as described herein.

The dash cam 300 may additionally include various buttons, switches, indicators, and ports for turning the dash cam 300 on and off, communicating with the dash cam 300 via WiFi or other wireless communication protocol, inserting and retrieving a memory card or other storage device, opening the dash cam 300 for repair or maintenance, etc. It is further noted that the dash cam 300 may or may not be designed specifically for the mount 100, 200, and that the device connector 120 of the mount 100, 200 may be used in place of a standard power cord to retrofit a preexisting dash cam 300.

The disclosure refers to a dash cam 300 as an example device to be mounted by the mount 100, 200. However, the disclosed embodiments are not intended to be so limited. Various devices, including, navigation systems such as GPS navigation aids, audio systems such as satellite radio, docks and chargers for mobile devices, and image or audio capture devices such as dash cams or other outward or inward facing cameras, or even dual outward/inward facing cameras, are also contemplated as being mountable by the mount 100, 200 in the same way as the dash cam 300.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A mount for an electronic device, the mount comprising:
   a suction cup defining a front face attachable to a flat surface and an opposed rear face;
   a plunger comprising a plunger head attached to the rear face of the suction cup and a plunger arm extending away from the plunger head;
   a plunger stator defining a guide passage through which the plunger arm reciprocates relative to the plunger stator;
   a plunger actuator movably engaged with the plunger arm on an opposite side of the guide passage as the plunger head;

an adapter attached to the plunger stator on the same side of the guide passage as the plunger head, the adapter defining an opening through which the plunger arm extends and a wire routing channel at least partially around a periphery of the adapter; and a mounting arm extending from the adapter and connectable to an electronic device.

2. The mount of claim 1, wherein the rear face of the suction cup covers the wire routing channel of the adapter.

3. The mount of claim 1, wherein the adapter further defines a plurality of wire routing passages between the wire routing channel and outside the adapter.

4. The mount of claim 3, wherein the plurality of wire routing passages includes a wire entry passage at a first end of the adapter and a wire exit passage at a second end of the adapter opposite the first end.

5. The mount of claim 3, wherein the mounting arm defines a mounting arm wire routing channel aligned with one of the wire routing passages of the adapter.

6. The mount of claim 1, wherein the mounting arm and the adapter are integrally formed.

7. The mount of claim 1, wherein the plunger and the suction cup are integrally formed.

8. The mount of claim 1, wherein the plunger actuator comprises a lever.

9. The mount of claim 1, further comprising a biasing member that biases the plunger head away from the plunger stator.

10. The mount of claim 9, wherein the biasing member comprises a spring disposed between the plunger stator and the plunger head.

11. The mount of claim 1, further comprising:

a device connector having a plug insertable into the electronic device, a first knuckle defining a hinge axis, and a wire;

wherein the mounting arm has a second knuckle rotationally engageable with the first knuckle by insertion of a pin along the hinge axis.

* * * * *